United States Patent [19]
Gainey et al.

[11] Patent Number: 5,712,974
[45] Date of Patent: Jan. 27, 1998

[54] METHOD AND APPARATUS FOR CONTROLLING THE CONFIGURATION DEFINITIONS IN A DATA PROCESSING SYSTEM WITH A PLURALITY OF PROCESSORS

[75] Inventors: Charles W. Gainey, Poughkeepsie, N.Y.; Matthias Gubitz, Boblingen, Germany; Harvey McGee, Hyde Park, N.Y.; Charles E. Shapley, Salt Point, N.Y.; Robert A. Smith, Apalachin, N.Y.; Werner Wicke, Calw, Germany

[73] Assignee: International Business Machines Corporation, Armonk, N.Y.

[21] Appl. No.: 412,386

[22] Filed: Mar. 28, 1995

[30] Foreign Application Priority Data

Mar. 30, 1994 [EP] European Pat. Off. .............. 94105038

[51] Int. Cl.⁶ .......................... H01J 13/00; G06F 9/00; G06F 9/40; G06F 9/44; G06F 9/46
[52] U.S. Cl. ........................ 395/200.1; 395/653
[58] Field of Search ................... 395/700, 650, 395/182.02, 141, 653, 200.1

[56] References Cited

U.S. PATENT DOCUMENTS

| | | | |
|---|---|---|---|
| 4,477,880 | 10/1984 | Advani | 395/700 |
| 4,649,479 | 3/1987 | Advani | 395/700 |
| 4,807,282 | 2/1989 | Kazan et al. | 379/284 |
| 4,965,719 | 10/1990 | Shoens et al. | 395/650 |
| 4,974,151 | 11/1990 | Advani et al. | 395/828 |
| 5,193,174 | 3/1993 | Bealkowski | 395/500 |
| 5,257,376 | 10/1993 | Beck | 395/700 |
| 5,257,379 | 10/1993 | Cwiakala et al. | 395/700 |
| 5,333,319 | 7/1994 | Silen | 395/650 |
| 5,535,326 | 7/1996 | Baskey et al. | 395/182.02 |

OTHER PUBLICATIONS

Wang, B. et al., "Database/domain approach to distributed systems management", Computer Communications, V. 12, N. 6, Dec. 1989, pp. 324–330.

"Method to Remotely Configure a Network Node from a Local Node", IBM Technical Disclosure Bulletin, V. 30, N. 3, Aug. 1987, p. 1407.

Aneroussis, N.G. et al., "A Multiprocessor Architecture for Real–time Emulation of Management and Control of Broadband Networks", Network Operations and Management Symposium, V. 2, 1992, pp. 346–460.

Rabie, S. et al., "An Integrated Architecture for LAN/WAN Management" Networks Opeation and Management Symposium, V. 2, 1992, pp. 254–265.

Edel, T.R. et al., "Establish Satellite Program System Service", IBM Technical Disclosure Bulletin, V. 16, N. 5, Oct. 1973, pp. 1479–1482.

*Primary Examiner*—Alvin E. Oberly
*Assistant Examiner*—Peter J. Corcoran, III
*Attorney, Agent, or Firm*—W. A. Kinaman, Jr.

[57] ABSTRACT

An apparatus and method for altering the configuration of a data processing system with a plurality of processors connected in a cluster or sysplex. On one of the processors, a TSO address space with modules for defining the configuration is started. These modules are able to request details of the input/output configuration datasets (IOCDS) stored on the other processors within the cluster, amend the information and return it to the other processors where it is available for use.

19 Claims, 8 Drawing Sheets

```
  VIEW    QUERY    HELP
 ─────────────────────────────────────────────
                CPC CLUSTER LIST            ROW x OF y
 SELECT ONE OR MORE CPCS, THEN SELECT AN ACTION.
        520 ──┐   530 ──┐   540 ──┐
 ─────── CPC ─── IODF ─── PROCESSOR ID ─────────
 510
 / SNA ADDRESS      TYPE   MODEL   PROCESSOR ID
 _ IBMHARP.CEC01    9672    608    CEC01
 _ IBMHARP.CEC02    9672    608    CEC02
 _ IBMHARP.CEC03    9672    608    CEC03
 _ IBMHARP.CEC04    9672    608    CEC04
 _ IBMHARP.CEC05    9672    608    CEC05
 _ IBMHARP.CEC06    9672    608    CEC06
 _ IBMHARP.CEC07    9672    608    CEC07
 # IBMHARP.CEC08    9672    608
                                       ..
 COMMAND ===>                              SCROLL ===> HALF
 F1=HELP     F3=EXIT      F4=PROMPT  F5=RESET    F7=BACKWARD
 F8=FORWARD  F9=SWAP      F10=ACTIONS F12=CANCEL F13=INSTRUCT F22=COMMAND
                                 F2=SPLIT
```

FIG.5

```
UPDATE   VIEW   QUERY   HELP
─────────────────────────────────────────────────────────────
                    IOCDS LIST                    ROW x OF y  MORE:
SELECT ONE OR A GROUP OF IOCDSs, THEN SELECT AN ACTION.
                                      ------TOKEN MATCH------      WRITE
 / IOCDS      NAME      TYPE    STATUS    IOCDS/HSA  IOCDS/PROC.  PROTECT
 _ A0.CPC01   AQIOCDS1  LPAR    POR       YES        YES          YES-POR
 _ A0.CPC02   AQIOCDS1  ESA390  POR       NO         YES          YES-POR
 _ A0.CPC03   AQIOCDS1  ESA390  POR       NO         YES          YES-POR
 _ A1.CPC01   AQIOCDS2  LPAR    ALTERNATE NO         NO           NO
 _ A1.CPC02   AQIOCDS2  ESA390  ALTERNATE YES        NO           YES
 _ A1.CPC03   AQIOCDS2  ESA390  ALTERNATE NO         NO           NO
 _ A2.CPC01                     INVALID
 _ A2.CPC02                     INVALID

COMMAND ===>                                      SCROLL ===>
 F1=HELP     F2=SPLIT    F3=EXIT     F4=PROMPT   F5=RESET    F7=BACKWARD
 F8=FORWARD  F9=SWAP     F10=ACTIONS F12=CANCEL  F13=INSTRUCT F20=RIGHT
 F22=COMMAND
```

FIG.6

IPL ATTRIBUTE LIST

ROW x OF y  MORE: >

UPDATE THE VALUES TO BE USED FOR THE NEXT IPL AND PRESS ENTER. TO VIEW THE VALUES USED FOR THE LAST IPL, SCROLL TO THE RIGHT.

/- 710  /- 720  /- 730                              /- 740

| PROCESSOR ID | PARTITION NAME | NEXT IPL DEVICE | IODF DEVICE | NEXT IPLPARM LOADxx SUFFIX | PROMPT/MSG OPTION | NUCLEUS SUFFIX |
|---|---|---|---|---|---|---|
| CPC01 | MVS1 | 0D00 | 0D00 | 12 | M | 0 |
| CPC01 | MVS2 | 0D00 | 0D00 | 37 | M | 0 |
| CPC01 | MVS3 | 0D00 | 0D00 | 56 | M |   |
| CPC01 | CF01 |      |      |    |   |   |
| CPC04 |      | 0A00 | 0A00 | 54 |   | 1 |

COMMAND ===>                                              SCROLL ===>
F1=HELP      F2=SPLIT     F3=EXIT      F5=RESET      F7=BACKWARD
F8=FORWARD   F9=SWAP      F12=CANCEL   F20=RIGHT     F22=COMMAND

FIG.7A

IPL ATTRIBUTE LIST

ROW x OF y   MORE: <

VIEW THE VALUES USED FOR THE LAST IPL.

| PROCESSOR ID | PARTITION NAME | LAST IPL DEVICE | IODF DEVICE | LAST IPLPARM LOADxx SUFFIX | PROMPT/MSG OPTION | NUCLEUS SUFFIX |
|---|---|---|---|---|---|---|
| CPC01 | MVS1 | 0D00 | 0D00 | 12 | M | 0 |
| CPC01 | MVS2 | 0D00 | 0D00 | 13 | M | 2 |
| CPC01 | MVS3 | 0D00 | 0D00 | 56 | M | 0 |
| CPC01 | CF01 | 0A00 | 0A00 | 54 | — | — |
| CPC04 |  | — | — | — | — | T |

COMMAND ===>                                    SCROLL ===>
F1=HELP    F2=SPLIT   F3=EXIT    F7=BACKWARD    F7=BACKWARD
F9=SWAP    F12=CANCEL F19=LEFT   F22=COMMAND

FIG.7B

METHOD AND APPARATUS FOR CONTROLLING THE CONFIGURATION DEFINITIONS IN A DATA PROCESSING SYSTEM WITH A PLURALITY OF PROCESSORS

BACKGROUND OF THE INVENTION

1. Field of the Invention

The invention relates to an apparatus for controlling configuration definitions in a data processing system comprising a plurality of main processors and a plurality of devices attached to the main processors. The invention further relates to a method for controlling the configuration definitions in the data processing system.

2. Related Art

The IBM MVS/ESA operating system includes a component known as the Hardware Configuration Definition (HCD) which allows the user to interactively enter definitions for operating systems and hardware configurations. (IBM is a registered trademark, and MVS/ESA and Hardware Configuration Definition are trademarks, of IBM Corporation.) This component is described in more detail in the IBM manual *MVS/ESA Hardware Configuration Definition: User's Guide*, IBM Form Number GC33-6457-02, and in the *IBM Technical Bulletin*, IBM Form Number GG24-4037-00. Various aspects of the HCD component are additionally described in U.S. Pat. No. 4,014,005 and U.S. Pat. No. 5,257,379.

The HCD component as it is currently delivered is able to control the configuration in a tightly coupled processor system. However, it is not able to reconfigure the hardware resources or operating systems in a parallel processing system such as that known as "Sysplex" and described in the article "Does SYSPLEX perplex you?" by R. D. Levy in the *Capacity Management Review*, vol. 21, no. 10, Oct. 1993, pp. 1–4.

IBM's Sysplex facility consists essentially of a plurality of S/390 processors running the MVS/ESA Operating System which are connected together. (S/390 is a registered trademark of IBM Corporation.) This connected facility has many advantages. For example, processing tasks may be divided up among the plurality of processors and thus performed more efficiently. A further advantage is achieved when one or more of the processors malfunctions; it is unlikely that the complete sysplex will fail since other processors are able to take over the functions of the failing processor. Similarly, when system maintenance has to be carried out, it is not necessary to completely switch off all of the processors. Use of the sysplex therefore minimises "down-time" and maximises availability of the computing resource.

The communication between processors in IBM's Sysplex has been described in two *IBM Technical Disclosure Bulletin* articles: "Use of XCF to Facilitate Communication among Independent Processors" by T. Hackett, *IBM Technical Disclosure Bulletin*, vol. 33, no. 11, April 1991, pp. 357–359 and "Intra-Network Communications Using Hardware-Software Networking", *IBM Technical Disclosure Bulletin*, vol. 36, no. 6A, June 1993, pp. 99–103. Neither of these articles discusses, however, how the inter-processing communication can be employed to construct, alter and manage the definitions of the hardware and software resources on the processors within the sysplex.

U.S. Pat. No. 5,168,555 (Byers et al.) discloses an initial program load control for a multi-processing system. The initial configurations of the processors within the system can be altered from a separate hardware control within the network connecting the processors together. The patent discloses no means, however, by which the systems programmer is able to control the configuration definitions of remote processors within the multi-processing system from an address space within a processor in the system.

EPO Patent Publication 238,364 (DEC) discloses a cluster console unit for a processing system. The console unit allows an operator to monitor the operation of the system comprising the cluster from a single console unit. The operator is able by means of the console unit to seize control of one of the systems and to adapt it as required. However, the disclosure of the patent does not teach how one might dynamically alter or reconfigure the configuration of the processors within the multi-processing system. This requirement is becoming particularly important in the modern data processing world since one wishes to ensure that at least some of the processors in the system are continuously available for use and thus eliminate "down-time".

SUMMARY OF THE INVENTION

An object of the invention is therefore to produce an improved apparatus and method for controlling the definition of configuration definitions.

A further object of the invention is to produce a system in which the definition of the configuration definitions can be changed from any processor within the parallel processing system.

A further object of the invention is to be able to dynamically adjust the configurations during operation of the parallel processing system.

These and further objects are solved by a communications means for communicating between each of the main processors, a plurality of configuration storage means accessible by said communications means for storing the configuration definitions of the plurality of processors, and a central configuration controller means within one of the processors for accessing the plurality of configuration storage means through the communications means.

The use of the central configuration controller means within one of the plurality of the main processors within the system has the advantage over the prior art that the central configuration controller means can be installed on any one of the processors within the sysplex. Unlike the prior art teachings of EPO Patent Publication 238,364 (DEC), there is no need for a special console unit for controlling the configuration definitions. Thus the prior art risk that the console unit malfunctions and the systems programmer is unable to reconfigure the multi-processing system is removed, since the systems programmer in the event of the malfunction of one of the processors in the IBM Sysplex is able to start the central configuration controller means within a functioning one of the processors in the sysplex.

In the preferred embodiment of the invention, the communications means includes a local area network and a service processor is connected between the local area network and the main processor. The local area network is a known and reliable technology for passing messages between various computers. Using the service processor as the connector between the local area network and the main processors ensures a reliable passing of messages between the main processors within the sysplex.

The main processors within the sysplex each have a memory attached to them. This provides the virtual storage means which is accessible by one of the main processors for storing the responses to requests issued by the communications means. The virtual storage means is accessible by the central configuration controller and stores the data required by the central configuration means for updating the configuration definitions. The virtual storage means is furthermore common to all of the user address spaces within the main processor. This allows the central configuration controller to run within any one of the user address spaces.

Within the virtual storage means, the responses are stored in a chained list within the virtual storage means. This is a known data structure which provides an efficient procedure for managing the data required by the central configuration means.

Additionally, the main processor running the central configuration means can be provided with a timer for indicating whether a response has been received from an initiated request within a set period of time. This ensures that once a request has been issued, the processing of the configuration changes does not come to a stop merely because the required data is never provided. Routines are incorporated which ensure that, at the end of the time-out period, remedial measures are undertaken to ensure the further operation of the system.

The failure of a main processor and its subsequent shutdown is one example of the case that a response is never received from a request. The central configuration means can accordingly adjust its operation and check whether the main processor not replying to a request is still connected within the sysplex before continuing with its processing.

Advantageously, the apparatus further has a master address space separate from the user address spaces for receiving the responses from the communications means, passing the responses to the virtual storage means and informing the central configuration controller of the receipt of a response. The use of a master address space to receive the responses allows different central configuration controllers in several user address spaces to issue requests asynchronously and to ensure that the data is then provided to the correct issuing central configuration controller.

The invention further provides for a method for controlling configuration definitions in a data processing system with a plurality of main processors comprising the steps of (1) determining the main processors in the data processing system, (2) receiving from the determined main processors the configuration storage data, (3) manipulating the received configuration storage data, and (4) returning the configuration storage data to the processors.

By means of the first and second steps of the method according to the invention, it is possible to gather all of the data required for the management of the configuration definitions in the remote main processors into a single local main processor. The systems operator can access the data from the local main processor, amend it as required and then return it to the remote main processors for operation. This is an advantage over the prior art in that any of the main processors within the sysplex can be chosen as the local main processor. Additionally, by managing the configuration data of several remote main processors at the same time on a single local main processor, one can coordinate configuration changes within the data processing system. The systems operator can amend the data relating to the resources in the system and attributes and other information associated with the resource data.

At the end of the method steps described above, a fifth step of replacing the currently accessed configuration storage data with the manipulated configuration storage means is incorporated in order to ensure that the remote main processors use the adapted configuration storage means in their future operation.

One use of the method is to update the received storage means from the remote main processors with data relating to new resources added to the data processing system.

The first step of the method comprises the substeps of (a) issuing a command over communications means between the main processors, (b) receiving responses from the communications means, (c) storing the responses in virtual storage, and (d) using the responses to display a list of main processors within the data processing system. This list of main processors is usable to initiate the second step.

The second step comprises the substeps of (a) issuing a command over communications means between the main processors, (b) receiving responses from the communications means, (c) storing the responses in virtual storage, and (d) using the responses to display a list of configuration storage means within the data processing system. Using the list of configuration storage means the third step of the inventive method can be directly initiated.

DESCRIPTION OF THE DRAWINGS

FIG. 5 shows a panel returned by the QUERY READ (CLUSTER) command.

FIG. 6 shows a panel returned by an IOCDM command.

FIG. 7A and 7B show the panels returned by an ATTRIB command.

DETAILED DESCRIPTION OF THE INVENTION

Figure 1:
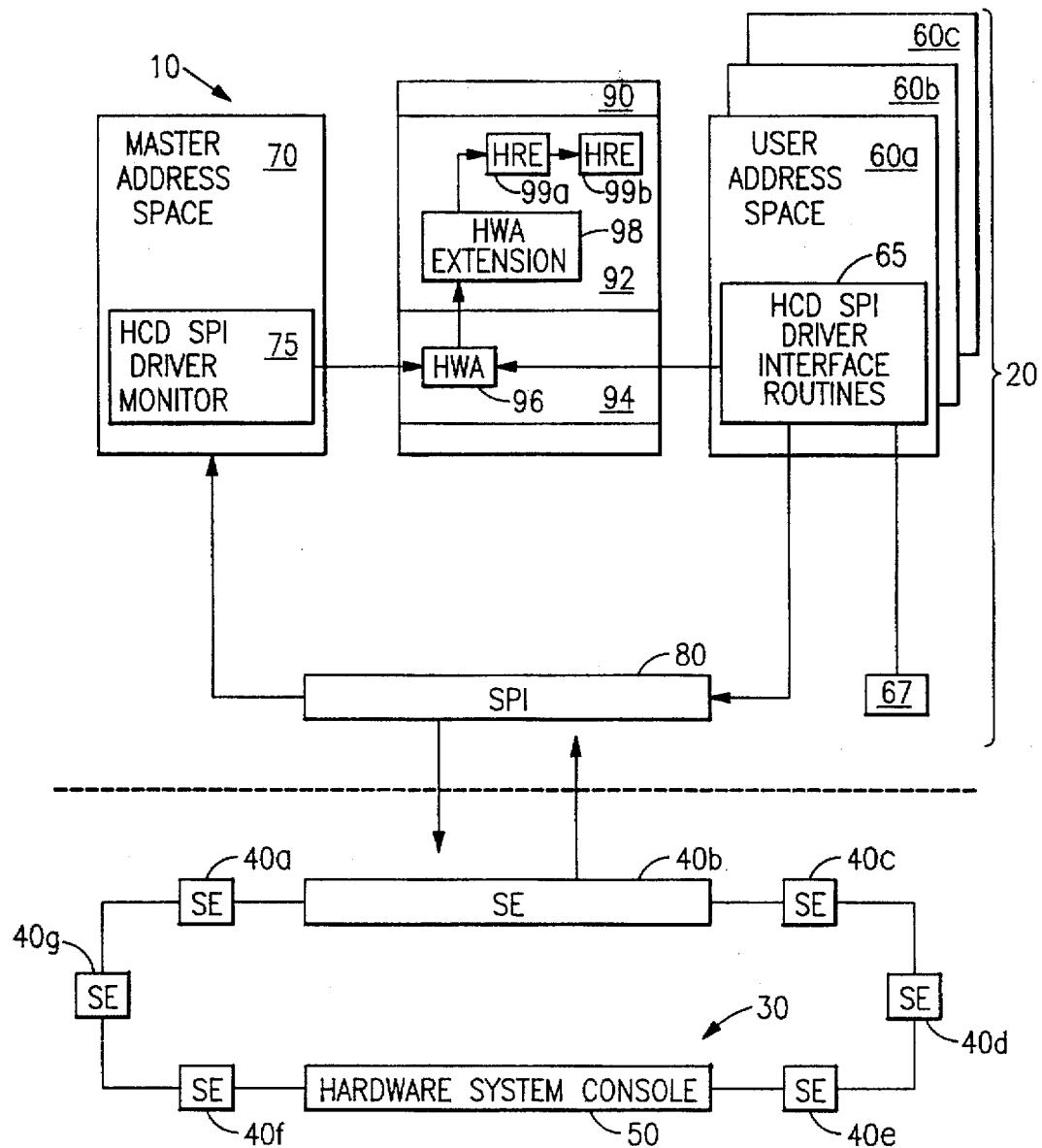
FIG. 1 shows an overview of the data processing system with processors according to the invention.

FIG. 1 shows an overview of a cluster 10 forming a central processor complex (CECPLEX). The cluster 10 comprises a plurality of main processors 20, of which only one is shown in the figure for clarity. The main processors 20 are connected to each other through a local area network 30 by support elements 40a–40f. In the preferred embodiment of the invention the support elements 40 are personal computers, such as the IBM PS/2 personal computer. (PS/2 is a registered trademark of IBM Corporation.) For simplicity, FIG. 1 shows only one processor 20 connected to one of the support elements 40. In practice, each support element 40 will have a processor 20 connected. A hardware system console 50 is incorporated into the local area network 30. By means of the hardware system console 50, the system programmer is able to configure the connections between the processors 20 in the cluster 10. The hardware system console 50 can also be used to seize control of any one of the processors 20.

The upper part of FIG. 1 shows the internal structure of one of the processors 20. The processor contains a plurality of user address spaces 60a–60c and a master address space 70. A service processor interface (SPI) component 80 acts as the interface between the support element 40 and the user address spaces 60 and master address space 70. Within the user address spaces 60 are found SPI driver interface routines 65 and within the master address space 70 is found an SPI driver monitor 75. The SPI driver interface routines 65 and the SPI driver monitor 75 contain the code for interfacing the SPI component 80 with the programs running within the address spaces 60, 70. In the exemplary embodiment of the invention, the user address spaces 60 are TSO address spaces.

A timer 67 is connected to the SPI driver interface routine 65 within the user address space 60. The timer 67 is started when a message is sent from the user address space 60 to the SPI component 80 and returns a time-out signal if a reply is not received within a specified amount of time.

The processor 20 further includes common virtual storage 90 which is divided into a nucleus 94 and an extended common storage area (ECSA) 92. The data in the common virtual storage 90 is accessible from all of the user address spaces 60 and the master address space 70.

Within the nucleus 94 is a HCD work area (HWA) 96 which is accessible to both the SPI driver interface routines 65 and the SPI driver monitor 75. A HWA extension 98 is found in the extended common storage area 92 as are HCD request areas (HREs) 99a and 99b. The storage address of the HWA extension 98 is found in the HWA 96. The HCD request areas 99 are chained together to form an HRE list, the storage address of the next element in the list being given in the previous element. The HWA extension 98 includes the storage address of the first member of the HRE list.

Figure 2:
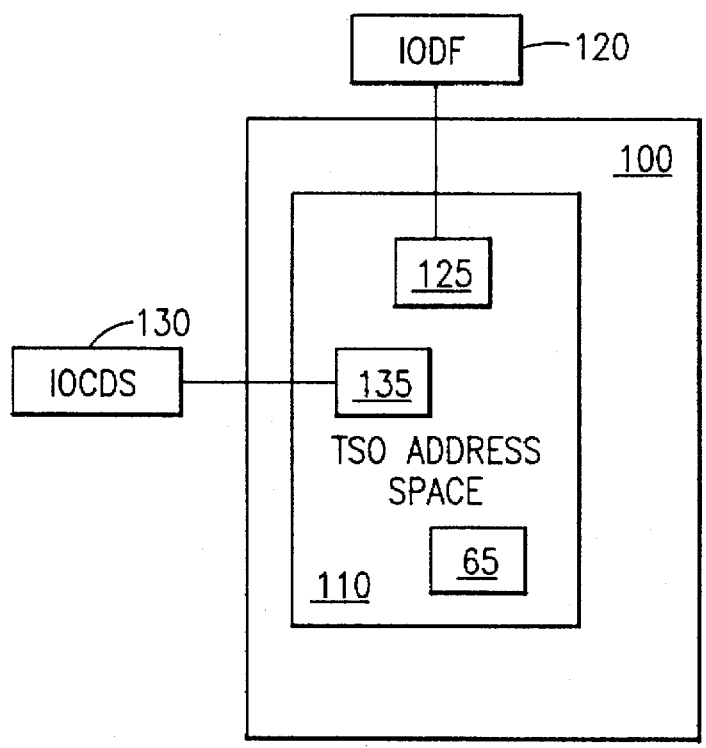
FIG. 2 shows the internal structure of the address space within a processor.

One component of the MVS/ESA operating system is the Hardware Configuration Definition (HCD) modules as shown in FIG. 2. The HCD modules allow a system programmer to define and configure the hardware and the topology of the processors 20 within the cluster 10.

FIG. 2 shows the structure of the MVS operating system 100 in a single processor system with a TSO address space 110 in which is running an HCD module. The TSO address space 110 corresponds to one of the user address spaces 60 in FIG. 1. It should be noted that HCD modules 110 are not the only MVS programs that can run in a TSO address space, there are many other programs known which also run in the TSO address spaces.

The HCD module 110 constructs and accesses two datasets: an input/output definition file (IODF) 120 and the input/output configuration dataset (IOCDS) 130 whose function will be explained later. Within the HCD module 110 are shown two blocks: the IODF block 125 and the IOCDS data block 135, whose function will also be explained later. The HCD module 110 further includes the SPI driver interface routines 65 which act as the interface between the programs running in the HCD module 110 and the service processor 40.

The IODF 120 contains details of the processors 20 and channel subsystems within the cluster 10. The channel subsystems include switches, devices, control units, configuration managers (such as the ESCON Manager), etc. (ESCON is a registered trademark of IBM Corporation.) The IODF 120 is constructed by the HCD module 110 running in the processor 20 and is programmed by the system programmer.

The IOCDS 130 datasets contain details of the configuration and topology of the hardware connected to a single one of the processors 20. So, for example, the IOCDS dataset 130 would contain details of the connections between one of the processors 20 in the cluster 10 and the channel subsystems connected to the processor 20. The IOCDS dataset 130 would not contain the details of the connections of the channel subsystems connected to the other ones of the processors 20 within the cluster 10. The connections to the other ones of the processors 20 are found within one of the IOCDS datasets 130 accessible to the other ones of the processors 20.

The IOCDS datasets 130 are used at power-on-reset (POR) time in order to construct the channel control blocks by means of which the processor 20 can access the devices, switches and control units within the channel subsystems.

More than one IOCDS dataset 130 can be associated with each processor 20. The plurality of IOCDS datasets 130 allows the system programmer to change the configuration of the channel subsystems of the processors 20 in the central processor complex 10 according to the data processing needs of the users.

Figure 3:
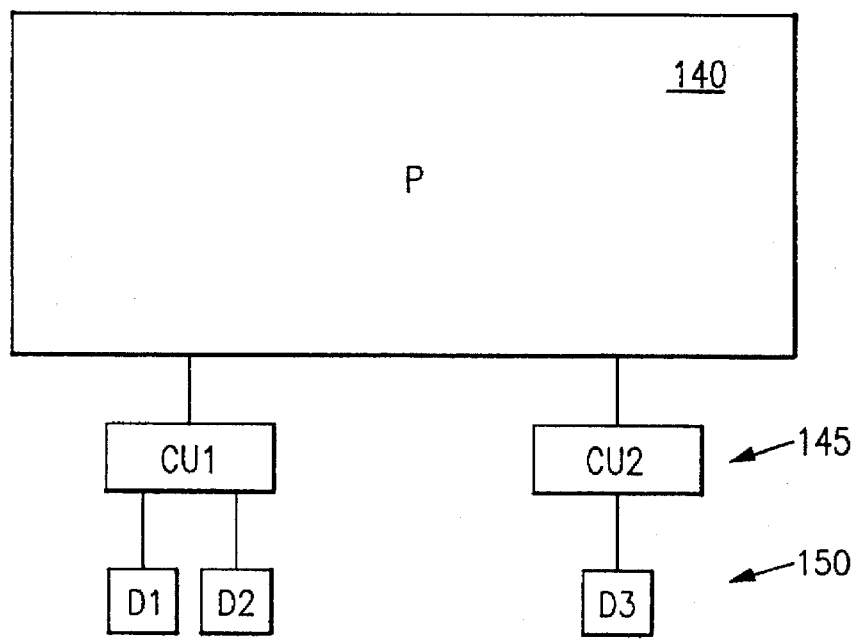
FIG. 3 shows an overview of a simple data processing system.

The structure of the IODF 120 can be best explained with the help of a simple system such as that shown in FIG. 3 which comprises a processor 140 (P) with a channel subsystem consisting of devices 150 (D1–D3) and control units 150 (CU1–CU2).

Figure 4:
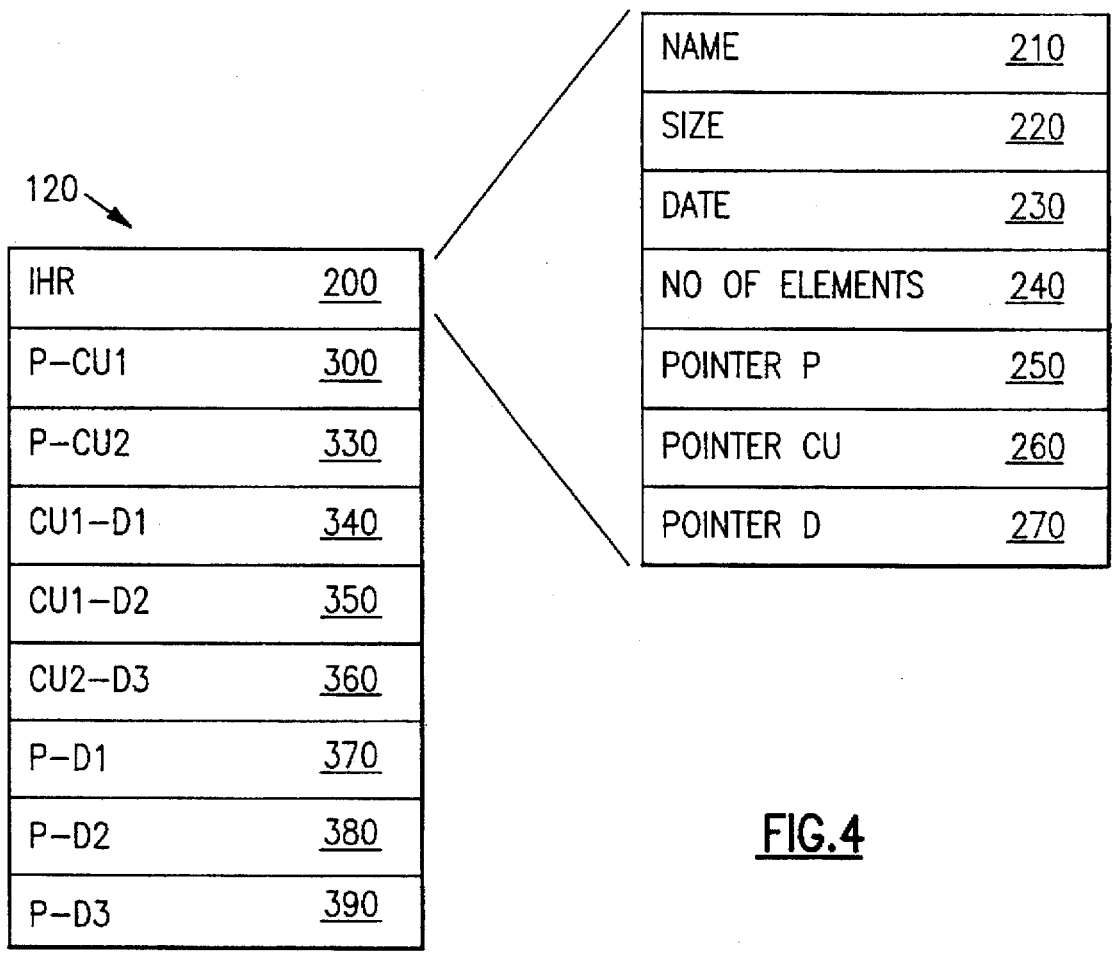
FIG. 4 shows the structure of an IODF.

The structure of the IODF 120 for the simple system of FIG. 3 is shown in FIG. 4. It comprises an IODF header record (IHR) 200 and a list of elements 300–390. The IHR 200 contains the name 210 of the IODF 120, the size 220 of the IODF 120, the date of construction 230 of the IODF 120, the number of elements 240 in the IODF 120, a pointer P (250) to the list of processors P in the data processing system, a pointer CU (260) to the list of control units in the simple system of FIG. 3 and a pointer D (270) to the to list of devices in the simple system of FIG. 3. In more complicated processor systems, the IODF 120 will additionally contain pointers to other objects which are included in the channel subsystems. The control units and the devices collectively form the channel subsystem attached to the processor 140.

The list of elements 300–390 in the IODF 120 shows all the possible connections between the processors P, control units CU1, CU2 and devices D1, D2 and D3 within the data processing system of FIG. 3.

The descriptions 340–390 of the possible connections between the processors 40 and devices 50 are known as device attachment records (DARs). The DARs include the unit address, the time out value and details of the preferred path between the devices 150 and the processor 140. The descriptions 300, 330 of the possible connections between the processors 140 and the control units 145 are known as the control unit attachment records (CARs).

The IODF 120 further comprises a list of processors P pointed to by the pointer P (250). The list of processors P is maintained as an AVL tree. Each element in the AVL tree has a record which indicates the name and type of processor P as well as other information related to the processor P. The IODF 120 also comprises a list of control units CU1, CU2 pointed to by the pointer CU (260). The list of control units CU1, CU2 is maintained as an AVL tree. Each element within the AVL tree contains information relating to the control units CU1, CU2. Finally the IODF 120 comprises a list of devices D1, D2, D3 pointed to by the pointer D (270). The list of devices D1, D2, D3 is also maintained as an AVL tree. Each element within the device AVL tree has a record which indicates the type of device (tape unit, DASD, terminal, etc.) and to which control unit it is attached. The elements within the AVL trees may include further information as required.

The devices, control units, switches, configuration managers, etc. in the channel subsystem can be collectively termed objects. Every time a new one of these objects is to be added to the data processing system, the IODF 120 has to be amended. For the simple system of FIG. 3, the system programmer does this by starting the HCD modules 110 in the address space 100 of the processor 140 and copying the IODF 120 into the TSO address space 110 of the processor 20 as is shown by IODF block 125 in FIG. 2.

The system programmer carries out the necessary modifications to the IODF block 125 within the TSO address space 110 to define the configuration and topology of the newly added objects to the central processor complex 10. The IODF block 125 within the memory is then written back to the IODF 120 stored on a device where it replaces the former IODF 120.

The newly added object is now defined to the IODF 120. However, until it is defined to the processor 140 in at least one IOCDS dataset 130, it cannot be accessed by the processor 140. The IOCDS datasets 130 have a similar structure to the IODF 120. Definition of the newly added object to the processor 140 is carried out by creating a new IOCDS dataset 130 or amending an existing IOCDS dataset 130. This is done by the system programmer starting the HCD modules 110 within the address space 110 of the processor 140 to which the newly added object is to be defined.

The updated IODF 120 is copied into the memory 10 as represented by the IODF bock 125 in FIG. 2. A new IOCDS (represented by block 135) is then created within the memory 10 by extracting the required data from the IODF block 65. The new IOCDS dataset 130 can then be written into a storage device on which the IOCDS datasets 130 are stored.

Having updated the IODF 120 and created the new or amended IOCDS dataset 130, the system programmer may remove the TSO address space 110 containing the HCD modules from the memory of the processor 20 as it is no longer needed. The newly added object is accessible to the cluster 10 when the IOCDS 130 in which it is described is next used by the processors 20 at initial programming load (IPL) time to define the configuration and topology of the hardware.

In the cluster 10 of FIG. 1, the IODF 120 includes information additional to that shown in FIG. 4 in order to be able to define the configuration of the cluster. The IODF 120 is expanded to include a network name which is the name of the cluster 10 and network addressable units (NAUs) which are the names of the processors 20 connected to the support elements 40 within the cluster 10. Whenever a new processor 20 is added to the cluster 10, the network name and a unique NAU is assigned to processor 20 and it is incorporated into the IODF 120. The name of the cluster and the NAU together form a System Network Architecture (SNA) address.

In order to manage the definition of the configuration of the hardware in the cluster 10, the HCD modules running in the TSO address space 110 offer a number of services additional to the prior art services which can be accessed by the systems programmer:

QUERY READ(CLUSTER)

This function allows the systems programmer to query all of the processors 20 within the cluster 10 on which HCD modules 110 are running. The query command returns to a display unit (not shown) visible by the systems programmer a panel 500 with the format as shown in FIG. 5. This shows the SNA address 510 of the processor 20 on which the HCD modules 110 are running, the type 520 of the processor 20 and its model number 530. In addition, the identification number 540 of the processor 20 within the IODF 120 is shown. The SNA address 510 is a combination of the network name, IBMHARP1 in this example, and the NAU, CEC01 in this example.

Having issued the command, the systems programmer is able to use this information in order to define configurations for the processors 20 within the cluster 10. It should be noted that the configuration of the processors 20 can only be carried out for those processors 20 within the cluster 10 on which the HCD modules 110 are running.

IOCDM

The IOCDM command allows the systems programmer to display a list of the IOCDS datasets 130 defined on each of the processors 20 within the cluster 10. The IOCDM command takes as an input the SNA address obtained by the QUERY READ(CLUSTER) command of each of the processors 20 for which the systems programmer wishes to display the IOCDS datasets 130.

The IOCDM command returns a panel 600 similar to that shown in FIG. 6. The panel 600 shows the plurality of IOCDS datasets 610 and their names 620 on each of the processors 20. The panel furthermore shows the type 630 of IOCDS dataset and the status 640 of each IOCDS dataset. "POR" in the status column 640 indicates a currently active IOCDS dataset in the processor 20. "Alternate" in the status column 640 indicates an alternative IOCDS dataset that could be used and "invalid" in the status column 640 indicates that the IOCDS dataset cannot be used. The token match 650 indicates the matching of the tokens of the operating system and column 660 indicates the write protect status of each of the IOCDS datasets running on the processor 20.

The systems programmer can use this panel in order to change the IOCDS attributes for any of the selected IOCDS datasets. These include:

i) disabling the write protection to allow the selected IOCDS datasets 130 on the processor 20 to be updated.

ii) enabling the write protection to prohibit the selected IOCDS dataset 130 being accidentally updated on the designated processor 20.

iii) switch the status of the active IOCDS dataset to allow the new IOCDS to activated at the next power-on-reset.

iv) distribute new configuration data from the IODF 120 for the channel subsystem of the processor 20 in the cluster 10. The selected IOCDS dataset 130 on the local or remote processor 20 will be correspondingly updated.

In order to carry out these functions, the data structures of the selected IOCDS datasets are passed from the remote processors 20 to the local processor 20 so that the information within the data structures may be altered.

ATTRIB

This command is used for controlling the initial programming load (IPL) attributes of the system control programs for each operating system partition running on the selected ones of the processors 20 in the cluster 10. The HCD modules 110 use the ATTRIB command to retrieve the requested information. For every processor 20, one ATTRIB command is issued containing one or more partition names.

FIGS. 7A and 7B show the panels 700 and 750 returned by the ATTRIB command. Both panels 700 and 750 show the processor identification number 710 and the name 720 of the partitions running on the processors 20. The panel 700 additionally shows the device address 730 of the next IPL and the corresponding parameters 740. The panel 750 shows the device address 760 of the last IPL and the corresponding IPL parameters 770. The panels 700, 760 can be altered and the ATTRIB command used to send the new attributes back to the processors 20.

Figure 8:
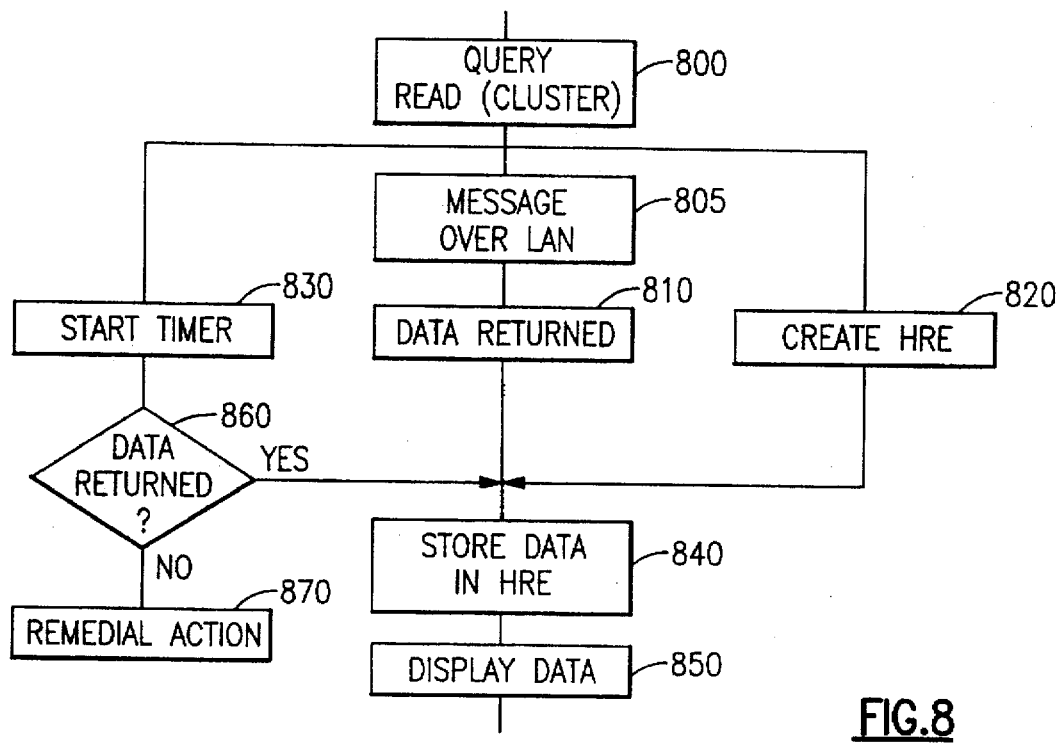
FIG. 8 shows a flow diagram illustrating the operation of the QUERY READ(CLUSTER) command.

The means by which the system programmer can alter the hardware configuration on any of the processors 20 within the cluster 10 will now be described using the flow diagram of FIG. 8 and the overview diagram of FIG. 1.

In a first step 800, a QUERY READ(CLUSTER) command is issued from a local one of the processors 20 in order to determine on which processors 20 in the cluster 10 the HCD modules 110 are running. For the purpose of this explanation, the local processor 20 will be defined as the processor 20 on which the system programmer is working. The other processors 20 within the cluster are called the remote processors 20.

The effect of issuing the QUERY READ(CLUSTER) command is for the SPI driver interface routines 65 within the user address space 60 to issue a message (step 805) which is passed to the SPI component 80. The SPI driver interface routines 65 translates this into a command for the SPI component 80 which then issues a command on the local area network 30. Each support element 40 connected to the local area network 30 receives the command. The support elements 40 return the network name and NAU of any processors 20 running the HCD modules 110 to the support element 40b connected to the processor 20 issuing the QUERY READ(CLUSTER) command. The SPI component 80 of the issuing, local processor passes the returned data (step 810) to the SPI driver monitor 70 of the master address space 70. Additionally, of course, information is gathered about the HCD modules 110 running on the local processor 20.

Concurrently with the issuance of the message (step 805) from the SPI driver interface routine 65, a further message is posted to the HWA 96 within the nucleus 94 to indicate that data is expected. The HWA creates (step 820) using the HWA extension 98 a HRE 99 within the extended common storage extension ready to receive the returned data. The returned data is passed from the SPI driver monitor 75 to the HWA and thence into the created HRE 98 where it is stored (step 840).

On issuance of the message from the SPI driver interface routine 65, the timer 67 is started (step 830). The timer 67 is set to a specific time-out value. If no data is returned to the issuing processor 20 within the specific time-out value (step 860), a time-out signal is returned to the SPI interface routines 65 to indicate the lack of data. This signal is passed to the HWA 96 to indicate that no data is expected and appropriate remedial action can be carried out (step 870).

The returned data stored within the HRE 99 is used to generate the panel shown in FIG. 5 (step 850) and can then be manipulated by the HCD modules 110 running within the issuing processor 20.

Figure 9:
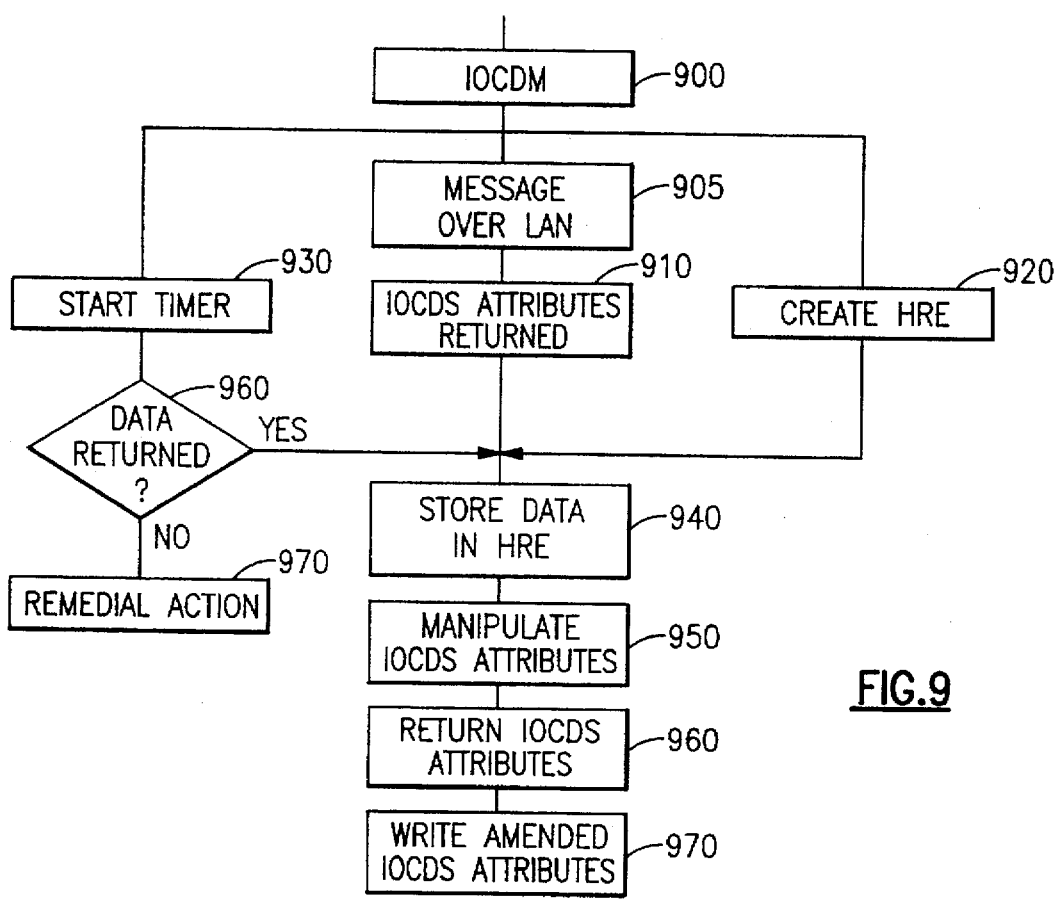
FIG. 9 shows a flow diagram illustrating the operation of the IOCDM command.

Using the panel of FIG. 5, the IOCDS dataset names on the remote processors 20 connected to the local area network 30 can be used to fetch and manipulate the attributes of the IOCDS datasets in the local processors. The flow diagram of FIG. 9 shows this process. In step 900, an IOCDM command is issued to the remote processor from the local processor 20 using the address of the remote processor obtained previously using the QUERY READ(CLUSTER) command.

In a similar manner to the issuance of the QUERY READ(CLUSTER) command, a message (step 905) is sent over the local area network 30 to the support elements 40 connected to the remote processors 20 from which the IOCDS attributes is to be returned (step 910). In step 940, the returned data is stored in the HRE 99 created in step 920. The timer 67 checks in steps 930 and 960 to see whether a time-out condition has occurred. If this is the case, then in step 970 remedial action is carried out.

The returned IOCDS attributes and information is stored in an HRE 99 from where they can be displayed and manipulated (step 950). In step 960, the updated IOCDS attributes are returned through the SPI interface routines, SPI component, support element 40b, local area network 30 to the support element 40 corresponding to the processor 20 on which it is to be stored (step 970).

In a similar manner, the ATTRIBUTE command can be issued to fetch the IPL attributes of the desired processors 20 in the cluster 10 using the addresses of the processors 20 fetched with the QUERY READ(CLUSTER) command. The IPL attributes are fetched, stored in the HCD Request Areas 99, manipulated and returned to the remote processors 20. In the remote processors 20, the IPL attributes are used at the next initial program load.

In order to complete the explanation of the invention, the function of the SPI driver monitor 75 in the master address space 70 and the HCD Request Areas 99 will be explained.

As mentioned above, the SPI monitor 75 in the local processor 20 receives the incoming data from the SPI component 80. The SPI monitor 75 is notified through the HCD work area 96 what incoming data to expect. The reports containing the data issued by each of the remote processors 20 do not all arrive at the same time but rather over a period of time. Only when all of the reports for the issued command have arrived within the time-out period (monitored by timer 67) and are stored in the virtual storage 90, will the SPI monitor 75 inform the HCD modules 110 running in the user address space 60 that the requested data has arrived.

In order to allow multiple HCD modules 110 to issue the requests to the remote processors 20 within the same MVS operating system image, each HCD module 110 has access to the SPI interface routines 65. The incoming reports from the remote processors 20 are passed to the SPI monitor 75 in order to determine the user address space 60 from which the request relating to the report was issued. The SPI driver monitor 75 stores and notes the address at which the data in the reports is stored and notifies the HCD modules in the issuing user address space 60.

The HCD request areas 99 store the data from the reports. They are chained together in a conventional manner known in the prior art and the initial HRE 99a is pointed to by a pointer in the HWA extension 98. When data in one of the HREs 99 is no longer needed, it can be deleted from the chained list and the storage space released for other use.

Figure 10:
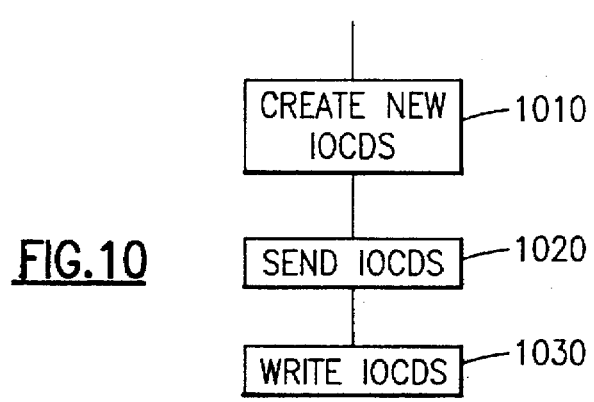
FIG. 10 shows a flow diagram for creating a new IOCDS.

Definition of a new IOCDS dataset for a remote processor 20 is shown in FIG. 10. In step 1010, a new IOCDS is created for the remote processor 20 by extracting from the IODF 120 information about the resources which are to be defined to the channel subsystem of the remote processor 20. The creation of the IOCDS is carried out in essentially the same manner as described previously in connection with FIG. 3.

In step 1020 the newly created IOCDS dataset is sent via the SPI component 80 over the local area network 30 to the support element 40 corresponding to the remote processor 20 on which the IOCDS dataset is to be placed. The IOCDS dataset is then written (step 1030) into the storage attached to the remote processor 20 from where it is available for use. Use of the IOCDS dataset can be initiated using the ATTRIB command as described previously.

What is claimed is:

1. Apparatus for controlling configuration definitions in a multiprocessor data processing system comprising a plurality of main processors and a plurality of devices attached to said main processors, comprising:

(a) communications means for communicating between each of said main processors;

(b) a plurality of configuration storage means accessible by said communications means for storing for each of said plurality of main processors one or more sets of configuration definition data, each set of configuration definition data comprising a complete configuration definition of a certain main processor and all devices accessible to said certain main processor; and (c) a central configuration definition controller (CCDC) means executable by any one of said main processors as a local processor for globally creating and/or modifying through said communications means for each one of said main processors as a remote processor said sets of configuration definition data, said CCDC means further comprising:

(1) determining means used by said main processors for allowing said local processor to query and for allowing all other main processors to signal their existence to said local processor;

(2) receiving means operable when modifying configuration definition data for requesting and receiving by said local processor from any one of said main processors as a remote processor a certain one of said sets of configuration definition data of said remote processor;

(3) manipulating means for creating and/or modifying on said local processor a certain one of said sets of configuration definition data of said remote processor; and (4) returning means for transferring said certain one of said sets of configuration definition data to said remote processor.

2. Apparatus according to claim 1 in which said communications means includes a local area network and a service processor connected between said local area network and each of said main processors.

3. Apparatus according to claim 2 in which said communications means comprises a service processor connected to each of said said main processors.

4. Apparatus according to claim 1 further comprising:

virtual storage means accessible by one of said main processors for storing responses to requests issuable by said communications means, said virtual storage means being accessible by said central configuration definition controller, said central configuration controller initiating said requests and evaluating the responses to the initiated requests.

5. Apparatus according to claim 4 in which said responses are stored in a chained list within said virtual storage means.

6. Apparatus according to claim 4 further comprising:

a timer for indicating whether a response has been received from said main processors for an initiated request within a set period of time.

7. Apparatus according to claim 1 further comprising:

a master address space for receiving the responses from the communications means, passing the responses to the virtual storage means, and informing the central configuration definition controller of the receipt of a response.

8. Apparatus according to claim 1 in which said returning means indicates to said remote processor to store said certain one of said sets of configuration definition data for future exploitation.

9. Apparatus according to claim 1 in which said returning means indicates to said remote processor to use said certain one of said sets of configuration definition data during the next power-on-reset (POR) process.

10. Apparatus according to claim 1 in which said returning means indicates to said remote processor to instantly adjust and dynamically activate said certain one of said sets of configuration definition data.

11. A method for controlling configuration definitions in a multiprocessor data processing system with a plurality of main processors, said main processors interacting by communication means, and a plurality of configuration storage means accessible by said communication means for storing for each of said plurality of main processors one or more sets of configuration definition data, each set of configuration definition data comprising a complete configuration definition of a certain main processor and all devices accessible to said certain main processor, said method comprising the steps of:

(a) selecting any one of said main processors as a local processor for globally creating and/or modifying for each one of said main processors as a remote processor said sets of configuration definition data; and (b) having said local processor perform the steps of:

(1) determining the main processors in said multiprocessor data processing system by querying all other main processors and letting said main processors signal their existence to said local processor;

(2) if modifying configuration definition data, requesting and receiving from any one of said main processors as a remote processor a certain one of said sets of configuration definition data of said remote processor;

(3) creating and/or modifying a certain one of said sets of configuration definition data of said remote processor; and (4) returning said certain one of said sets of configuration definition data to said remote processor.

12. The method of claim 11 wherein said creating and/or modifying step comprises the step of:

updating on said local processor said certain one of said sets of configuration definition data with data relating to new resources added to or deleted from said remote processor within the multiprocessor data processing system.

13. The method of claim 11 wherein said determining step comprises the steps of:

issuing a command over said communications means between the main processors;

receiving responses from the communications means originating from said main processors;

storing the responses in virtual storage; and using the responses to display a list of processors within the multiprocessor data processing system.

14. The method of claim 13 wherein the list is usable to initiate the requesting and receiving step.

15. The method of claim 11 wherein said requesting and receiving step comprises the steps of:

issuing a command over said communications means between the processors;

receiving responses from the communications means originating from said main processors;

storing the responses in virtual storage; and using the responses to display a list of sets of configuration definition data within the multiprocessor data processing system.

16. The method of claim 15 wherein the list of sets of configuration definition data is usable to initiate the requesting and receiving step for a certain one of said sets of configuration definition data.

17. The method of claim 11 wherein said returning step indicates to said remote processor to store said certain one of said set of configuration definition data for future exploitation.

18. The method of claim 11 wherein said returning step indicates to said remote processor to use said certain one of said sets of configuration definition data during the next power-on-reset (POR) process.

19. The method of claim 11 wherein said returning step indicates to said remote processor to instantly adjust and dynamically activate said certain one of said sets of configuration definition data.

* * * * *